United States Patent Office 3,302,592
Patented Feb. 7, 1967

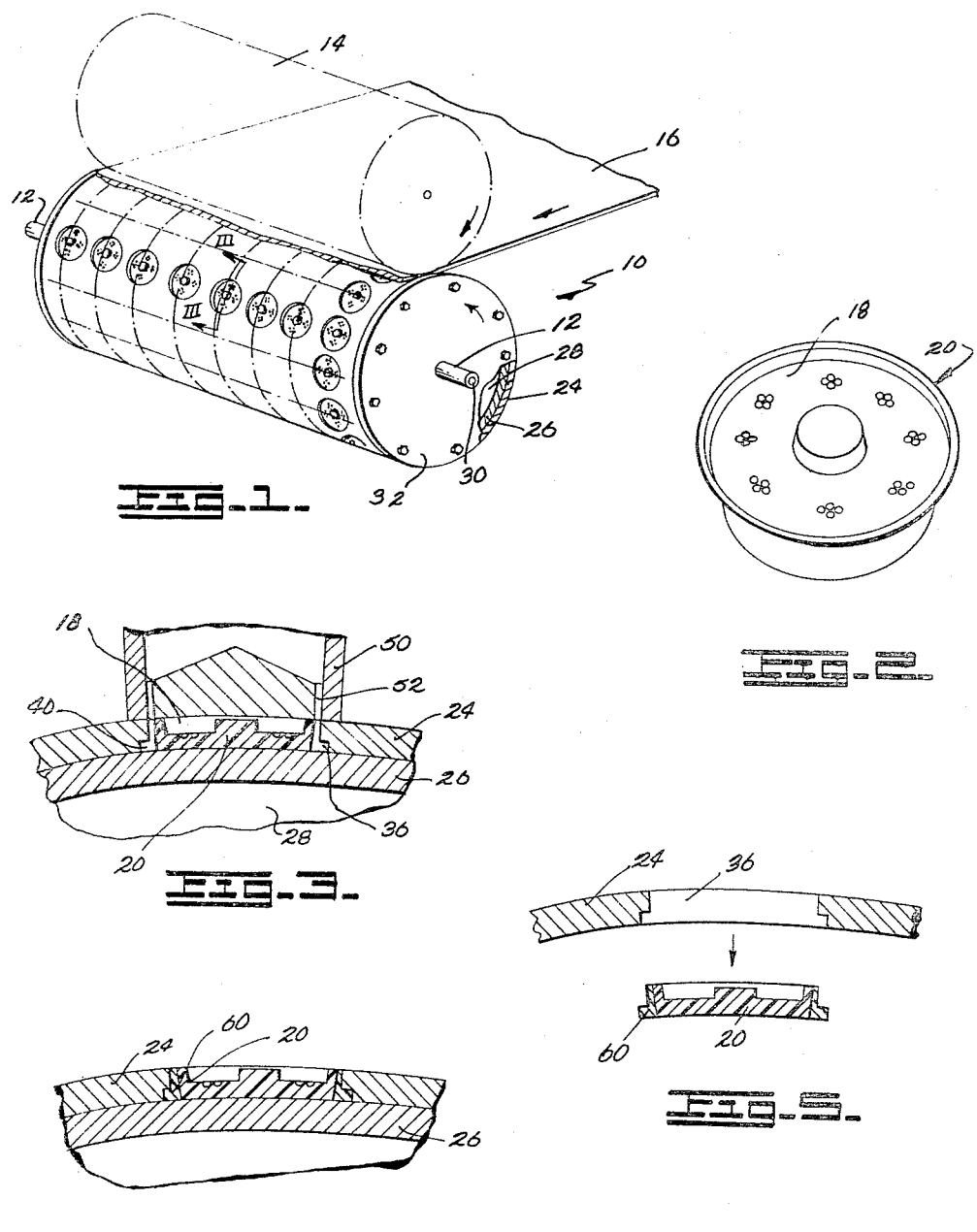

3,302,592
DIE CONSTRUCTION
Frank Charles Werner, Grand Rapids, Mich., assignor to Werner Machinery Company, Grand Rapids, Mich., a corporation of Michigan
Filed Dec. 4, 1962, Ser. No. 242,302
5 Claims. (Cl. 107—68)

This invention relates to a cookie forming die, and more particularly to a drum-type cookie die having uniquely retained, replaceable die inserts.

High volume production of cookies ordinarily necessitates the use of a revolving drum provided with a plurality of forming die inserts which cut, shape and configurate the periphery and face of cookies rapidly and continuously from a relatively continuous sheet of cookie dough. Each revolving cylindrical die cooperates with a cylindrical pressure roller to press dough therebetween and is ordinarily about 10 inches in diameter and from 18 to 48 inches long. These dimensions may vary.

The manufacture of each complete drum must presently perform a series of expensive machining oprations upon the cast drum and inserts. These operations include lathe turning, arcuate grinding, and slot milling. Each drum must be exactly machined to provide it with exactly sized and configurated openings to receive one of the metallic inserts, which also must be machined to an exact tolerance and curvature to fit the opening. When the inserts and openings are interfitted, the inserts are retained tightly in position by special keys which fit into milled keyway slots beneath each insert. If these inserts are not securely and absolutely locked in place so that no movement can occur, the high pressure imparted to the cookie dough between the drums causes the dough to penetrate along the side walls of the insert and under the insert. Once this happens, one edge of the insert protrudes outwardly past the peripheral surface of the drum. This completely prevents proper cutting and forming of cookies from the dough, as is well-known, because the other edges will not cut clear through the dough. Even with extremely close tolerances, dough penetrates into the tiny side clearances, thereby necessitating careful cleaning thereof.

Some manufacturers are presently attempting to eliminate some of the costly machining and keying operations by bolting the inserts into the drum using studs embedded in the inserts. However, it has been found that the holding nuts often vibrate loose on these structures, so that in a relatively short time, pressurized dough readily works under the inserts, lifts them up, and thereby upsets the complete high speed operation. Since the drum interior is preferably enclosed to allow hot water flow, constant tightening of the nuts is impractical. Hundreds of cookies can be wasted before such a machine is brought under control. Consequently, the only really reliable structure known heretofore has been that using the expensive keyed metallic inserts. When using these metallic inserts, each insert face must be specially coated with a dough-releasing substance, of which plastics such as Teflon and nylon, have been found to work well.

Because prior structures require the openings in the drum and the cooperating inserts to be machined to match each other with close tolerances, this not only increases the expense of the structure, but also prevents simple replacement of inserts with others. It completely prevents replacement of an insert of one diameter or configuration with another insert of slightly larger or smaller diameter or different configuration. As one cookie design goes out of style, the cookie maker must purchase completely new sets of complete drums. He can either retain the expensive old drums in an ever increasing inventory, or can scrap them.

It is therefore an object of this invention to provide a cookie drum die that eliminates the major share of expensive machining operations heretofore required for a reliable structure. The die inserts need not be machined at all. The drum need only be machined on its periphery. Neither the inserts nor the insert-receiving-openings in the drum need be held to accurate tolerances. In fact, a substantial initial difference in dimension, e.g. ¼ inch or so can be readily tolerated and is normal before the final operation. No keyways are necessary either in the inserts or drum. Yet the inserts are absolutely and securely anchored. Further, the inserts are completely sealed with respect to the drum in spite of the large clearances. Therefore, no dough whatever can penetrate between the inserts and drum, not even around the sides. Not only is the insert absolutely anchored, therefore, but also no dough can possibly get under the insert to force it radially outwardly.

It is another object of this invention to provide a readily assembled, cylindrical cookie die with inserts that cannot possibly vibrate loose to allow radially outward shifting as with present inexpensive bolted-type inserts. There are no bolts or other threaded parts in the novel structure. Yet the structure is relatively inexpensive, and can compete in price with the inferior bolted-type construction.

It is another object of this invention to provide a cookie die with plastic inserts that are not only excellently sealed against dough penetration, and are readily manufactured and assembled without expensive machining, but which can also be completely replaced with other inserts of different face patterns, and even of somewhat different diameters. This eliminates the necessity of each cookie maker having a great many un-needed and unused drums. The complete set of relatively inexpensive, plastic, molded inserts in a drum may be removed and substituted by new inserts as is necessary, even though no bolts or other threaded parts are used.

It is still a further object of this invention to provide a cookie die drum with plastic die inserts that require no additional release coating for the dough since a complete insert can be readily formed of a releasing plastic such as nylon, Teflon or other suitable material.

These and several other objects of this invention will be apparent upon studying the specification in conjunction with the drawings in which:

FIG. 1 is a perspective view of a cookie die drum cooperating with another pressure roller shown in phantom to form cookies out of a cookie sheet;

FIG. 2 is a perspective view of a die insert;

FIG. 3 is a sectional view of the drum in FIG. 1, taken on plane III—III during assembly of the insert into the drum;

FIG. 4 is a sectional view of the structure in FIG. 3 after the insert is anchored; and FIG. 5 is a sectional view of the apparatus in FIGS. 3 and 4 showing the first step of replacement of an insert with another insert.

Basically, the novel cookie die drum comprises a pair of closely interfitted telescoping cylindrical sleeves with plastic die inserts retained in special undercut openings in the outer sleeve by injection molded plastic retention rings fused to the inserts and sealing the openings around the inserts. Axial removal of the inner sleeve allows the inserts to be punched radially inwardly to remove them for replacement by a second set of inserts.

Referring to the drawings, the novel cookie die drum 10 is rotatably mounted on suitable axle means 12. It cooperates with a pressure roller 14 shown in phantom to squeeze a continuous sheet 16 of cookie dough therebetween, thereby pressing the dough into each of the plurality of female die cavities 18 in inserts 20 which are retained flush in the periphery of the drum. Each of these inserts has a selected relief pattern on the face of cavity 18 to provide the desired face pattern on the cookie to be formed.

Each of the novel drums is formed of two concentric, metallic, cylindrical sleeves, outer sleeve 24 and inner sleeve 26. Suitable hot water passageways 30 lead to and from the hollow interior 28 of the drum, for example, in one end of axle means 20 and out the opposite end. Thereby the die can be maintained at a desired operating temperature by hot water flowing therethrough. The ends of the drum may be closed by suitable caps 32.

Outer sleeve 24 includes a plurality of radially extending openings 36 spaced around the periphery of the drum and extending clear through the sleeve as shown in FIG. 3. The outer surface of inner sleeve 26 serves as a rigid support for the plurality of inserts 20 to be mounted in the periphery of the drum. Each opening 36 may be formed in sleeve 24 during casting and/or machining of the sleeve, and includes an undercut portion 40 on the radially inner surface thereof. This undercut portion may vary in width and configuration, providing it supplies locking retention as will be understood. It need not extend all around the periphery of opening 36 but may be only in certain portions thereof. It preferably is adjacent the inner surface of the outer sleeve to enable the units to be punched out and replaced as in FIG. 5. Therefore, the radially outer diameter or dimension of each opening 36 is substantially smaller than the radially inner diameter or dimension.

These openings may be round, square, oblong, etc. to suit a particular range of inserts. Since the hole is substantially larger than the insert 20 by a fraction of an inch, the specific diameter of the insert may vary within the limited range so that close tolerances need not be held either in the opening or on the outside diameter of the insert.

Although the insert shown is round, it may vary in configuration to suit the situation. The novel inserts are premolded of plastic material having sufficient strength to withstand the cookie forming pressures without losing shape, and having dough-releasing characteristics. The preferred plastics are nylon or Teflon due to their release characteristics. The specific polymers or copolymers which will satisfy these requirements are many as will be evident to the ordinary artisan. The material must also have sufficient compatibility with the sealing ring plastic around it to bond securely thereto, preferably by fusion of the substances.

To securely anchor each insert in position, a suitable plastic injection pressure head 50 is held tightly against the drum periphery over insert opening 36, with injection passageways 52 coinciding with the annular ring-shaped space around insert 20 in opening 36 (FIG. 3). Pressurized flowable fluid plastic is then forced down through passageways 52 into the annular space to completely fill this space, including undercut portion 40. This plastic fuses with the insert 20 as it cures. The molten plastic may be of the same material as the insert or a polymer compatible therewith to secure good bonding, preferably by fusion, and retention. Suitable hardeners, plasticizers and modifiers to suit the selected material and known within the science of plastics are used. Since these are obtainable from any handbook, a list thereof would be superfluous and unnecessary to those in the art. The injected plastic also seals tightly against the peripheral walls of opening 36 to completely seal the area from dough penetration. When this plastic retention ring cures into a solid ring 60, it absolutely anchors the insert and prevents it from any movement radially outwardly because of the undercut securement. Instead of the inwardly tapering peripheral configuration of insert 20, it may be outwardly tapering to even further strengthen the structure.

Inner sleeve 26 serves as a rigid support under the plastic injection pressure. If sleeve 26 itself is not sufficiently rigid to resist the pressure of the injected plastic, the interior of the drum may be pressurized by filling it with a suitable liquid such as water and temporarily sealing the outlets.

Alternatively, during the injection molding process, a solid core interfitted tightly inside sleeve 24 may be inserted in place of sleeve 26. However, since it is desirable to circulate hot water through a hollow drum during operation, the solid core could be axially pressed out of the outer sleeve by a power press after the inserts are all anchored, and substituted by sleeve 26 having a hollow interior.

After anchoring the first insert, the pressure head is then moved to the next insert where plastic is injected around the insert to secure it in place and so forth. Obviously, several inserts may be accommodated at once by a larger head if desired.

During operation of the drum, it rotates fairly rapidly against adjacent drum 14, or in a closely spaced relationship thereto. Dough sheet 16 is fed therebetween. Considerable pressure is applied to the sheet by the rollers to force the dough into recesses 18 of inserts 20. Even though pressure is applied to the dough around the edge of the recess, penetration of dough between the insert and the walls of the opening, or under the insert to force it radially outwardly, is resisted. This space is completely sealed by plastic 60 bonded to insert 20 and sealed to the walls of the opening. Further, due to the unique interlock of the retention ring 60 under the undercut portion, there is no chance of the bonded insert and ring moving radially outwardly by vibration or otherwise.

After extended use of the drum in FIG. 1 with a specific face pattern dimension and configuration on the inserts, replacement of the inserts with new ones can be readily effected. This is achieved by removal of end caps 32, and axial pressing of the tightly interfitting inner sleeve 26 out of the outer sleeve in a telescopic fashion to remove the inner support for the inserts. Then radially inwardly directed pressure is applied to the inserts 24 to punch them out of the sleeve periphery. Since each insert 20 and its ring 60 are securely bonded together, both are removed at the same time in a neat, convenient manner. These are relatively inexpensive items. Thereafter, the inner sleeve 26 is pressed back into its closely fitting relationship to the outer sleeve, and new inserts with a different pattern are anchored according to the method illustrated in FIG. 3 and described above. Not only can the face pattern of the new insert vary, but also the width or diameter of the insert may actually vary, for example by about an eighth of an inch, since the plastic forming the retention ring will merely fill up the annular space remaining between the insert and the walls of the opening. In fact, it is even possible to insert a polygonal insert into a round opening, or a round insert into an oblong opening, etc. and then merely fill the annular cavity around it. Other various possibilities will also be apparent. Various other structural modifications to suit a particular situation, but within the inventive principles as taught, may occur to those in the art upon studying the above specification. These obvious modifications are deemed to be part of this invention, which is to be limited only by the scope of the appended claims, and the reasonably equivalent structures and methods to those defined therein.

I claim:

1. A rotational cookie die assembly comprising: a tubular cylindrical drum having rotational axle means on its central axis; a plurality of configurated cookie-forming die inserts retained in the periphery of said drum in a pattern to die form cookie dough with rotation of said drum on said axis, each having a curved outer surface area and a peripheral surface flush with the outer surface of said drum; each insert being positioned in a respective drum opening substantially larger than the insert; each opening being undercut around at least portions thereof spaced from said drum periphery; and solidified molding material in said opening around said insert and bonded thereto, flush with the drum periphery, filling said undercut and bonded thereto to sealingly anchor said insert in position.

2. A rotational cookie die assembly comprising: a tubular cylindrical drum having rotational axle means on its axis and having a plurality of like recesses in a pattern around its periphery; a polymeric, configured die insert positioned in each of said recesses and having an outer face curvature the same as the curvature of said drum; each recess being substantially larger in diameter than its insert and having an undercut portion spaced from the drum periphery; and solidified injection molded plastic around and bonded to said insert and filling the recess area around said insert flush to said drum periphery, filling and bonded to the undercut portion, to sealingly anchor said insert in position and prevent penetration of cookie dough between the insert and drum.

3. A cookie die comprising: a drum including an outer cylindrical sleeve fitted tightly over an inner cylindrical support; said sleeve having a plurality of openings around its periphery and extending to said inner support; a die insert in each opening having a diameter smaller than said opening; said opening having undercut portions; solidified molding material in a ring around and bonded to each insert in said opening and undercut portions to retain said insert against outward radial movement; said inner support being removable from said sleeve; and the bonded insert and ring being ejectable as a unit radially inwardly.

4. A cookie die comprising: a drum including an outer cylindrical sleeve fitted tightly over an inner cylindrical support sleeve; said outer sleeve having a plurality of openings around its periphery and extending to said inner support; a plastic die insert in each opening having a diameter smaller than said opening; said opening having undercut portions; solidified injection plastic molding material fused to and around each insert as a ring in said opening, and in said undercut portions to retain said insert against outward radial movement; said inner support sleeve being axially removable from said outer sleeve; and said combined plastic insert and plastic ring being ejectable radially inwardly as a unit to allow replacement thereof with another insert and retention ring.

5. A method of making a cookie die drum having replaceable inserts, comprising the steps of: forming a plurality of openings in the periphery of a cylindrical sleeve; providing the radially inner diameter of each opening with a greater dimension than the radially outer diameter; axially pressing a cylindrical inner support core tightly inside said sleeve; placing into each opening a plastic die insert having a smaller diameter than said opening to rest on said support; injecting flowable bondable plastic into said opening around the insert; and solidifying the injected plastic to fuse it to said insert and secure it against radially outward displacement.

References Cited by the Examiner
UNITED STATES PATENTS

| | | | |
|---|---|---|---|
| 194,110 | 8/1877 | Sargent. | |
| 516,885 | 3/1894 | Barr | 101—377 X |
| 1,542,564 | 6/1925 | Liese | 50—120 |
| 2,863,337 | 12/1958 | Ackley | 76—107 |
| 3,025,727 | 3/1962 | Smith | 83—698 X |

ROBERT E. PULFREY, *Primary Examiner.*

J. D. BEIN, *Examiner.*